Dec. 2, 1958 — L. W. ALEXANDER — 2,862,740
BALL JOINT
Filed May 21, 1956
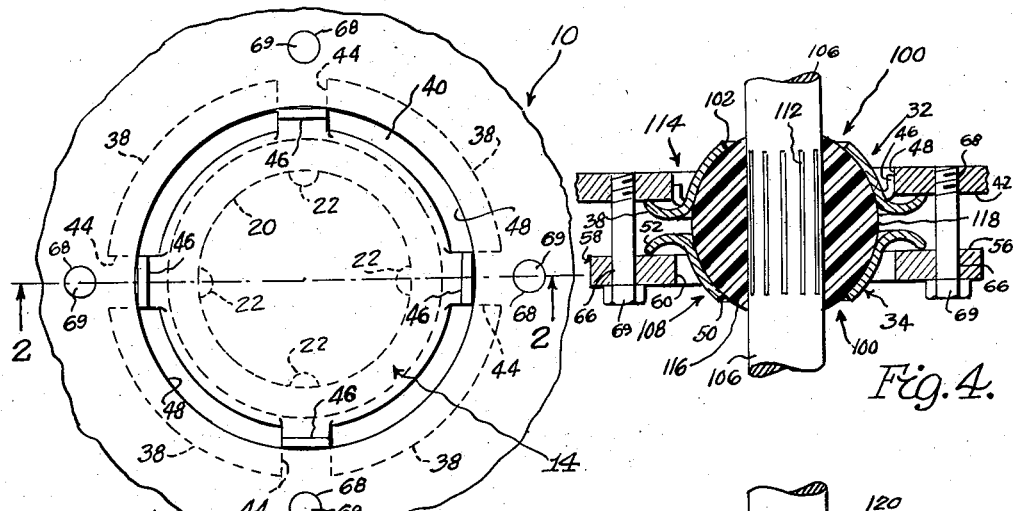
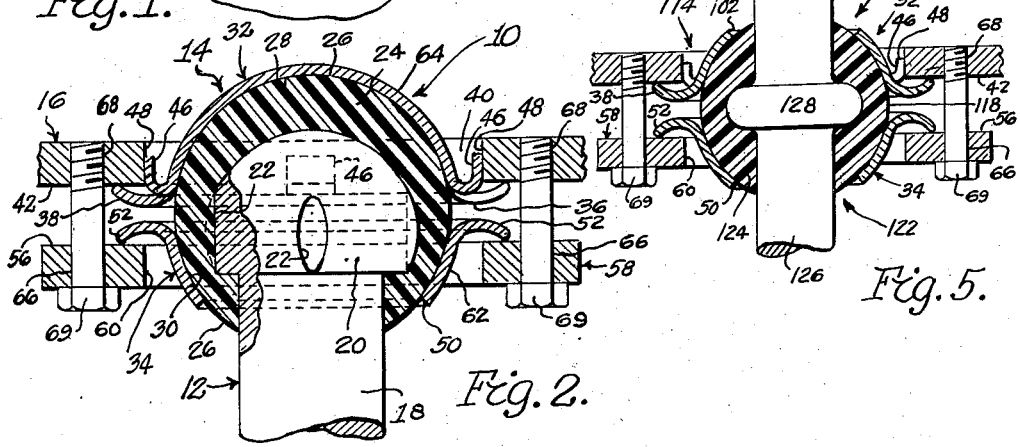
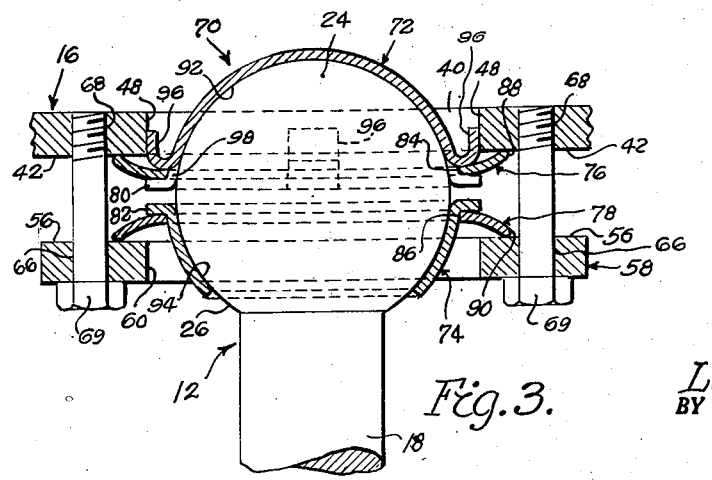
Fig. 1. Fig. 2. Fig. 3. Fig. 4. Fig. 5.
INVENTOR.
Lewis W. Alexander
BY Barthel + Bugbee
Attys 2,862,740
BALL JOINT Lewis W. Alexander, Northville, Mich., assignor to Halex Corporation, Plymouth, Mich., a corporation of Michigan Application May 21, 1956, Serial No. 586,016

13 Claims. (Cl. 287—85)

This invention relates to ball joints and, in particular, to composite ball joints, the components of which are made up of different materials.

One object of this invention is to provide a composite ball joint composed in part of metal and in part of plastic material, such as the polymeric amide plastic known commercially as nylon, having greater resistance to wear and a smoother and softer action than prior ball joints, particularly those used for front and rear wheel suspensions on automobiles.

Another object is to provide a composite ball joint of the foregoing character wherein the socket members in which the ball oscillates are quickly and easily adjusted by the use of constantly available tools such as ordinary wrenches.

Another object is to provide a composite ball joint of the foregoing character which is adaptable either to a ball on the end of a rod or to a ball intermediate the ends of the rod, as for automobile front wheel suspension.

Another object is to provide a composite ball joint of the foregoing character wherein the socket members are resiliently mounted by means of spring portions either integral with the socket members or separate therefrom.

Another object is to provide a composite ball joint of the foregoing character wherein the socket members are resiliently supported not only for motion in the direction of the axis of the rod on which the ball is mounted but also in a direction transversely thereto.

Another object is to provide a process of making a composite ball joint of the foregoing character with particular reference to the formation of a plastic ball on or around a metallic head or enlargement on a rod, or around roughened portions on the rod, wherein the plastic is pressed in the form of a powder around the head, enlargement or roughened portion of the rod, and sintered to secure it firmly and permanently in position, the preferred plastic being the powdered polymeric amide plastic known as nylon.

Other objects and advantages of the invention will become apparent during the course of the following description of the accompanying drawings, wherein:

Figure 1 is a top plan view of a composite ball joint employing a synthetic plastic ball member according to one form of the invention, shown for purposes of example as applied to an automobile front wheel suspension;

Figure 2 is a central vertical section, with the rod head partly in side elevation, taken along the line 2—2 in Figure 1;

Figure 3 is a view similar to Figure 2 of a modified ball joint employing cupped spring washers to exert resilient force on the socket members, with the ball member shown in side elevation;

Figure 4 is a central vertical section through a further modified ball joint wherein the synthetic plastic ball is mounted on a roughened portion of a rod intermediate the ends thereof, as exemplified by an automobile rear wheel suspension; and Figure 5 is a view similar to Figure 4 of a further modified ball joint as exemplified by an automobile rear wheel suspension wherein the synthetic plastic ball is formed around an intermediate enlargement on the rod.

Referring to the drawings in detail, Figures 1 and 2 show a composite ball joint, generally designated 10, according to one form of the invention as consisting generally of a rod and ball unit 12 resiliently mounted in a socket structure, generally designated 14, one element of which consists of a sheet metal member 16 forming a part of the machine, such as an automobile front wheel suspension, in which the ball joint 10 is used. The rod and ball unit 12, as its name suggests, consists of a rod 18 of steel or the like having a head or similar enlargement 20 on the upper end thereof, the head 20 being shown merely for purposes of example as bulbous and not necessarily spherical, with peripheral flutes or grooves 22 disposed parallel to the axis of the rod 18. The head 20 is formed in any suitable manner, such as by the so-called cold-heading process, the exact manner of formation being beyond the scope of the present invention.

Substantially surrounding the head 20 and the rod 18 attached thereto is a ball portion 24 of synthetic plastic material, such as the polymeric amide plastic known commercially as nylon, and having a spherical outer surface 26. The rod and ball unit's ball portion 24 of Figures 1 and 2 is formed by pressing suitable powdered synthetic plastic material, such as, for example, polymeric amide around the head 20 and adjacent portion of the rod 18 in a mold in a suitable press (not shown) and sintering the assembly thus created in order to secure the ball portion 24 firmly to the rod 18. The consequent shrinkage of the ball portion 24 in cooling, because of the greater coefficient of expansion of the synthetic plastic material than the steel of the rod 18 and its head 20 increases the tenacity of adherence and grip between the ball portion 24 and the rod 18 and its head 20.

The spherical convex surface 26 of the ball portion 24 slidably and oscillatably engages spherical concave surfaces 28 and 30 respectively of upper and lower socket units, generally designated 32 and 34 respectively, preferably of resilient sheet steel. The upper socket unit 32 is of nearly hemi-spherical extent with an interrupted upwardly concave integral peripheral flange 36 composed of circumferentially-spaced quadrant spring flange portions 38 extending through a circular aperture 40 in the sheet metal member 16 and engaging the lower surface 42 thereof (Figure 2).

Extending through the circumferential gaps 44 between the quadrant spring flange portions 38 are integral upturned lugs 46 engageable with the cylindrical side walls 48 of the aperture 40 and disposed approximately parallel to the axis of the aperture 40. The upturned concave quadrant spring flange portions 38 thus engage the sheet metal member 16 and the aperture wall 48 substantially at right angles to one another so as to resiliently support and engage the upper socket member 32 relatively to the sheet metal member 16 both axially and transversely.

The lower socket member 34, in contrast to the upper socket member 32, is not approximately hemi-spherical, but is roughly in the form of a zone of a hemisphere with a central aperture 50 of sufficiently larger diameter than the rod 18 to allow the desired angle of rocking of the rod 18 relatively to the axis of the upper socket member 32. The lower socket member 34, like the upper socket member 32, is preferably of resilient sheet steel but has a substantially continuous downwardly-concave annular flange 52 integral therewith and spaced a short axial distance from the quadrant spring flange portion 38 of the interrupted peripheral flange 36 so as to provide an annular adjustment space therebetween. The outer edge of the flange 52 engages the upper surface 56 of a ring, generally designated 58, having a central aperture 60 therein through which the cupped central portion 62 of the lower socket member 34 extends downward, even as the cupped central portion 64 of the upper socket member 32 extends upward through the central aperture 40 in the sheet metal member 16. The ring 58 and sheet metal member 16 are provided with aligned smooth-walled and threaded bores 66 and 68 respectively spaced circumferentially around their respective apertures 60 and 40 and adapted to receive cap screws, bolts or other threaded fasteners 69.

In the operation of the composite ball joint 10, the bolts 69 are adjusted so that the ring 58 is pulled toward the sheet metal member 16 a sufficient distance to exert sufficient force on the edges of the flange 52 and interrupted flange 36 so as to resiliently urge the upper and lower socket members 32 and 34 toward one another to provide the desired slipping engagement of their spherical surfaces 28 and 30 by the ball portion 24 on the head 20 of the rod 18. As a consequence, the rod and ball unit 12 is resiliently and yieldably supported in the upper and lower socket units 32 and 34 in an axial direction, and at the same time is yieldably supported in an approximately radial transverse direction by the spring lug 46 acting against the side walls 48 of the aperture 40 in the sheet metal member 16.

The modified composite ball joint, generally designated 70, shown in Figure 3 is generally similar to the composite ball joint 10 of Figures 1 and 2, insofar as the construction of the rod and ball unit 12 is concerned, and also with respect to the construction of the sheet metal member 16 and ring 58, hence similar parts are designated with the same reference numerals. The upper and lower socket members 72 and 74 respectively differ slightly in construction from the upper and lower socket members 32 and 34 respectively in that the axial force urging them toward one another and into engagement with the ball portion 24 is provided by a pair of upper and lower cupped annular spring washers 76 and 78 engaging the quadrant spring flange portion 80 of the upper cupped spherical socket member 72 and the continuous annular flange 82 of the lower cupped zonal socket member 74. The flanges 80 and 82 instead of being concave, are approximately radial and flat, and are engaged by the inner portions of the annular cupped spring washers 76 and 78 which have central apertures 84 and 86 respectively encircling their respective socket members 72 and 74. The outer edge portions 88 and 90 of the cupped annular spring washers 76 and 78 respectively engage the lower surface 42 of the sheet metal member 16 and the upper surface 56 of the ring 58 as abutments so that the spring force or resilience of the washers 76 and 78 is exerted in opposite directions against the flanges 80 and 82 to urge the upper and lower socket members 74 in opposite directions against the spherical surface 26 of the plastic ball portion 24 of the rod and ball unit 12. The socket members 72 and 74 have spherically-curved concave surfaces 92 and 94 respectively engageable with the spherical surface 26 of the ball portion 24 and the upper socket member 72 also has upturned spring lugs 96 disposed in the gaps 98 between the quadrant flange portions 80 so as to engage the side wall 48 of the central aperture 40 in the sheet metal member 16.

The operation of the modified composite ball joint 70 of Figure 3 is similar to that of the composite ball joint 10 of Figures 1 and 2, with the exception of the fact that the spring effector urging the upper and lower socket members 72 and 74 toward one another is brought about by the action of the cupped spring washers 76 and 78, the adjustment of which as to resilience is effected by the bolts 69. The resilient mounting of the ball joint, however, is effected by the spring lug 96 in an approximately radial transverse direction in a manner similar to the action of the spring lugs 46 of the ball joint 10.

The further modified composite ball joint, generally designated 100, shown in Figure 4 employs a socket structure 114 which is substantially the same in construction as the socket structure 14 of Figures 1 and 2 and similar parts are therefore similarly designated with reference numerals, differing only in the additional provision of a central aperture 102 in the upper socket unit 32, similar to the central aperture 50 in the lower socket unit 34 thereof. The additional aperture 102 is made necessary by the fact that the rod 106 of the rod and ball unit 108 of the ball joint 100 extends through the upper socket unit 32 as well as through the lower socket unit 34, hence both are provided with central apertures 102 and 50 respectively. Both the upper and lower socket units of the socket structure 114 are therefore of segment-shaped form instead of only the lower socket member 34 being of segment-shaped form, as in the socket structure 14 of Figures 1 and 2.

The rod and ball unit 108 of Figure 4 has a roughened portion 112 formed intermediate the ends of the rod 106, such as by splining or grooving this intermediate portion 112. The ball portion 116 of the rod and ball unit 108 with its spherical outer surface 118 is formed by pressing suitable powdered synthetic plastic material, such as, for example, polymeric amide plastic commercially known as nylon, around the roughened portion 112 in a mold in a suitable press (not shown) and sintering the assembly thus created in order to secure the ball portion 116 firmly to the rod 106. The consequent shrinkage of the ball portion 116 in cooling, because of the greater coefficient of expansion of its synthetic plastic material than the steel of the rod 106, increases the tenacity of adherence and grip between the ball portion 116 and the rod 106.

In the use of the modified ball joint 100 of Figure 4, which is shown as applied to the rear wheel suspension of an automobile, the rod 106 is adapted to oscillate at both its upper and lower ends within the upper and lower socket units 32 and 34, because of the provision of the upper and lower apertures 102 and 50 respectively therein. The adjustment of the ball joint 100 and its resilient action is otherwise substantially the same as that described above in connection with the ball joint 10 of Figures 1 and 2 and hence requires no additional discussion.

The further modified ball joint, generally designated 120, shown in Figure 5 employs the same socket structure 114 as in the modified ball joint 100 of Figure 4, and the only modification is in the rod and ball unit 122 thereof, particularly in the means by which the ball portion 124 is prevented from axial slippage along the rod 126. The latter is provided with an annular enlargement 128 at approximately the location coinciding with the center of the ball portion 124, such as by a cold heading or upsetting process, and the powdered synthetic plastic material of the same kind as that set forth in connection with the discussion of Figure 4 molded around the enlargement 128 in the same manner as that also described in connection with Figure 4. The adjustment of the ball joint 120 is also similar to that of the ball joint 100 of Figure 4 in order that the spherical outer surface 118 of the ball portion 124 will slip smoothly within the upper and lower socket units 32 and 34 as described above in connection with Figure 4. The operation of the ball joint 120 is also substantially identical with that described above in connection with Figure 4, and hence requires no repetition.

What I claim is:

1. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shell being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell.

2. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the support-mounted shell being of smaller diameter than the support aperture and having contact portions extending outwardly therefrom into engagement with the wall of said aperture.

3. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the rim of the support-mounted shell being of concave configuration toward the abutment surface and having substantially line contact therewith.

4. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the rim of the support-mounted shell being discontinuous with gaps between the sections thereof and having contact portions in said gaps extending outwardly from its shell into engagement with the wall of said aperture.

5. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the rims of the shells being bent away from one another into substantially line contact with the abutment surface and the urging means respectively.

6. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the support-mounted shell being of smaller diameter than the support aperture and having contact portions extending outwardly therefrom into engagement with the wall of said aperture, the rim of the support-mounted shell being of concave configuration toward the abutment surface and having substantially line contact therewith.

7. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the rim of the support-mounted shell being discontinuous with gaps between the sections thereof and having contact portions in said gaps extending outwardly from its shell into engagement with the wall of said aperture, the rim of the support-mounted shell being of concave configuration toward the abutment surface and having substantially line contact therewith.

8. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the support-mounted shell being of smaller diameter than the support aperture and having contact portions extending outwardly therefrom into engagement with the wall of said aperture, the rims of the shells being bent away from one another into substantially line contact with the abutment surface and the urging means respectively.

9. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member disposed between said shells in rocking engagement with said bearing surfaces, an elongated connecting element secured to said ball member and extending outwardly through said opening, and means engageable with the rim of the other shell for urging said other shell and said ball member into yielding engagement with the support-mounted shell, the rim of the support-mounted shell being discontinuous with gaps between the sections thereof and having contact portions in said gaps extending outwardly from its shell into engagement with the wall of said aperture, the rims of the shells being bent away from one another into substantially line contact with the abutment surface and the urging means respectively.

10. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, each of said shells having an opening therein, a ball member disposed between said shells in rocking engagement with said bearing surfaces, an elongated connecting element secured to said ball member and extending outwardly through said openings, and means engageable with the rim of the other shell for urging said other shell and said ball member into yielding engagement with the support-mounted shell.

11. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, each of said shells having an opening therein, a ball member disposed between said shells in rocking engagement with said bearing surfaces, an elongated connecting element secured to said ball member and extending outwardly through said openings, and means engageable with the rim of the other shell for urging said other shell and said ball member into yielding engagement with the support-mounted shell, said elongated element extending through said ball member and having an interlocking portion grippingly engageable therewith.

12. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, one of said shells having an opening therein, a ball member of synthetic plastic material disposed between said shells in rocking engagement with said bearing surfaces, an elongated connecting element having an interlocking portion disposed within said ball member in gripping engagement therewith and extending outwardly through said opening, and means engageable with the rim of the other shell for urging said other shell and said ball member into yielding engagement with the support-mounted shell.

13. A ball joint for attachment to a support having an aperture with an adjoining abutment surface, said ball joint comprising a pair of cupped shells of resilient material and of sphere-segment form having concave spherical bearing surfaces facing one another and having transversely-projecting rims spaced apart from one another, one of said shells being mounted in the aperture of the support with its rim engaging the abutment surface thereof, each of said shells having an opening therein, a ball member of synthetic plastic material disposed between said shells in rocking engagement with said bearing surfaces, an elongated connecting element having an interlocking portion disposed within said ball member in gripping engagement therewith and extending outwardly through said openings, and means engageable with the rim of the other shell for urging said other shell and said ball member into yielding engagement with the support-mounted shell.

References Cited in the file of this patent

UNITED STATES PATENTS

| Number | Name | Date |
|---|---|---|
| 1,917,742 | Tinsley | July 11, 1933 |
| 1,976,258 | Hollingsworth | Oct. 9, 1934 |
| 2,305,880 | Leighton | Dec. 22, 1942 |
| 2,417,160 | Graham | Mar. 11, 1947 |
| 2,425,138 | Venditty | Aug. 5, 1947 |
| 2,637,986 | Iredell | May 12, 1953 |
| 2,731,813 | Sampson | Jan. 24, 1956 |